Oct. 6, 1931.  A. F. MASURY  1,826,359
VEHICLE DRIVE FOR RADIAL ENGINES
Filed Sept. 26, 1929
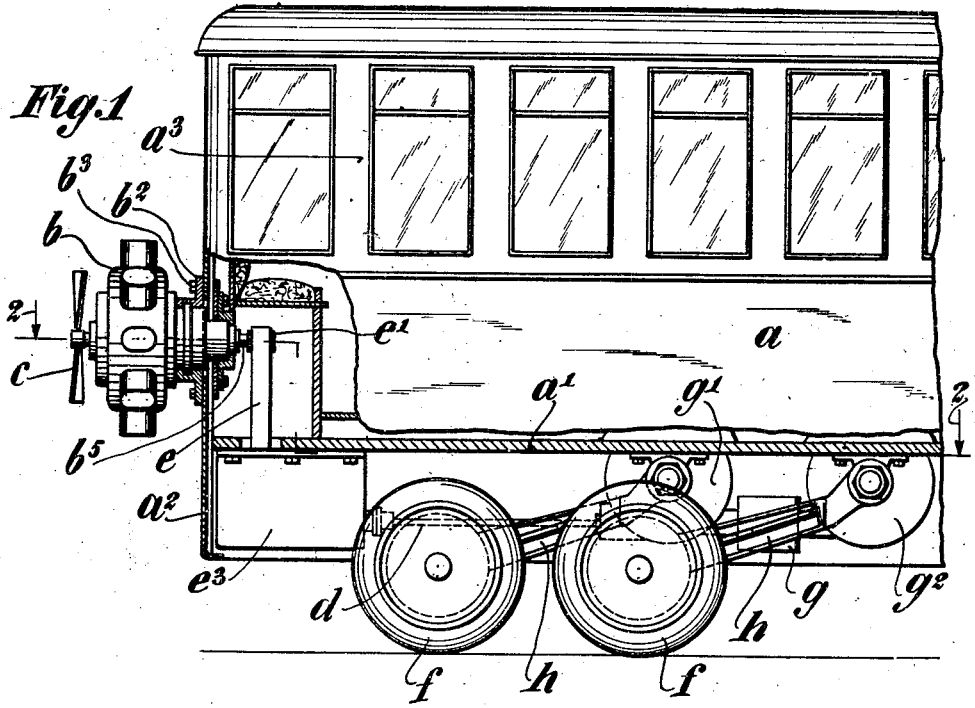
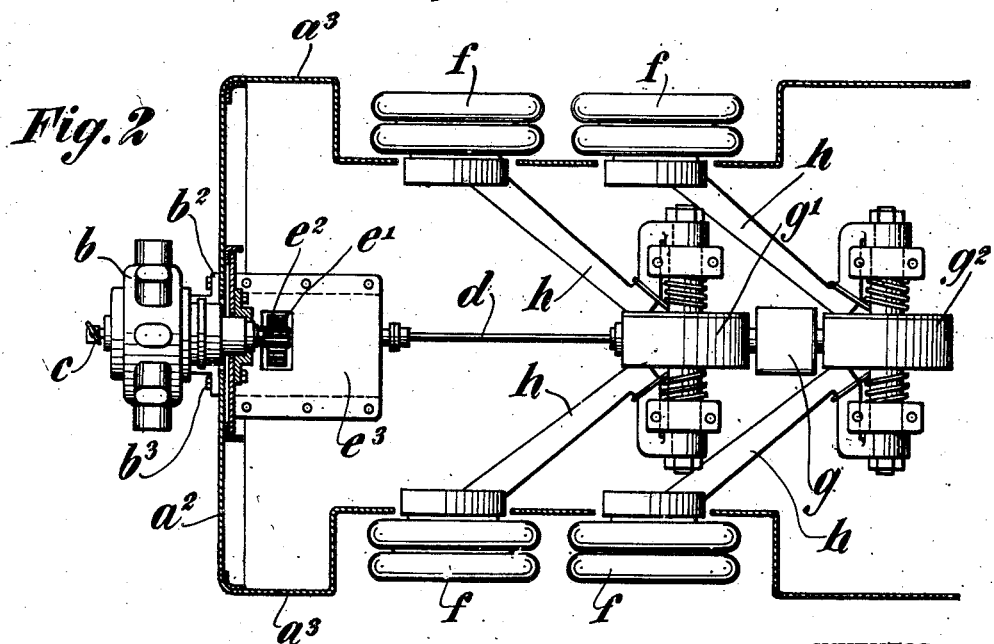
INVENTOR
Alfred F. Masury,
BY
Redding, Greeley, O'Shea & Campbell
ATTORNEYS Patented Oct. 6, 1931

1,826,359

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

VEHICLE DRIVE FOR RADIAL ENGINES

Application filed September 26, 1929. Serial No. 395,283.

This invention relates to motor vehicles which have their engines mounted at the rear thereof.

An object of the invention is the provision of means whereby an engine may be mounted along with a transmission including reduction gearing at the rear of a vehicle. More specifically, this invention involves a construction in which a radial air cooled engine is mounted on the rear of a vehicle body and drives the rear wheels of the vehicle through reduction gearing connected to a differential.

Another object of the present invention is to reduce the clearance usually necessary between the ordinary differential and the vehicle frame by mounting the reduction gearing on the vehicle body and using individually sprung wheels.

Other objects of the invention will appear from the detailed description of the drawings which form a part of the present disclosure, and in which:

Figure 1 is a view in elevation, partly in section, of the rear of a vehicle in accordance with the present invention.

Figure 2 is a plan view, partly in section, taken along the line 2—2 of Figure 1.

There is shown at $a$ a vehicle body having a floor $a'$, a rear wall $a^2$ and side walls $a^3$. Mounted on the rear wall of the vehicle is a radial motor $b$, which is air cooled, and for general usage may have nine cylinders and develop around 200 H. P. at 2600 R. P. M. This motor is carried on the vehicle frame through any usual form of radial motor mount $b^2$ detachably secured to the rear wall through bolts $b^3$. Secured to the crank shaft of the engine is a fan $c$ designed to supply air to the cylinders to cool them.

Between the engine and the driving wheels of the vehicle there is connected speed reducing mechanism whereby the propeller shaft $d$ is driven at a speed of, say, one-third of that of the engine. This mechanism consists of a silent chain $e$ driven from the crank shaft $b^5$ through a gear $e'$. This chain drives a gear $e^2$ in the reduction gear box $e^3$, from which the propeller shaft $d$ is driven. The reduction gear box $e^3$ is secured to the floor of the vehicle in any suitable manner.

The propeller shaft $d$ may drive the wheels of the vehicle $f$ through suitable differentials $g$, $g'$ and $g^2$ connected to the wheels through the angular members $h$, as described in my copending application for United States Letters Patent, Serial No. 388,116 filed August 24, 1929.

It will be appreciated that, while the invention has been described with reference to the particular embodiment illustrated, many changes may be made without departing from the spirit of the invention. Thus, no limitation is intended on the scope of this invention, save as defined in the appended claim.

What I claim is:

In a vehicle, a relatively high speed radial air cooled motor secured to with the rear wall of the vehicle on the outside thereof and reduction gearing secured to the floor of the vehicle and operatively connected to the motor and to the driving wheels of the vehicle.

This specification signed this 23 day of September, A. D. 1929.

ALFRED F. MASURY.